Figure 1:
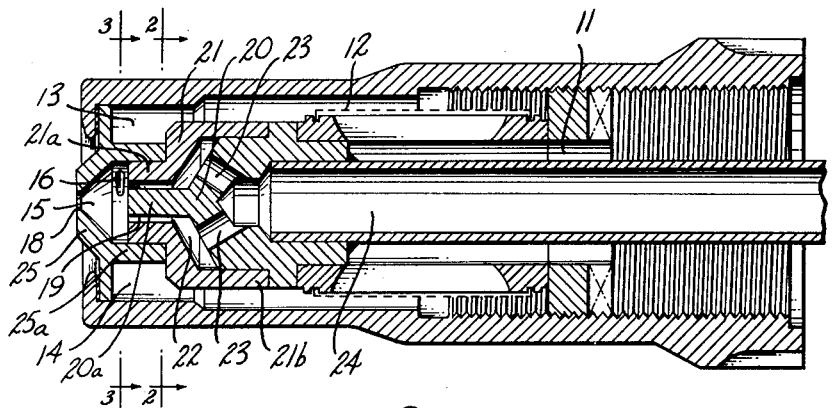

Dec. 21, 1954  O. HAHN  2,697,636
LIQUID FUEL BURNER
Filed Dec. 20, 1949

INVENTOR.
OSCAR HAHN
BY Reynolds, Beach & Christensen
ATTORNEYS

United States Patent Office 2,697,636
Patented Dec. 21, 1954

2,697,636

LIQUID FUEL BURNER

Oscar Hahn, Middleton Cheney, near Banbury, England, assignor to Dowty Equipment Limited, Arle Court, England Application December 20, 1949, Serial No. 134,090

7 Claims. (Cl. 299—120)

This invention relates to liquid-fuel burners of the kind known as "Spill" burners in which, except during certain operating conditions, only a proportion of the fuel supplied to the burner passes out through the discharge orifice and the remainder flows back along a return line. These burners have the discharge orifice arranged as a co-axial outlet from a swirl chamber to which the fuel is supplied tangentially, and as at present generally constructed have a return or spill orifice which is axially in line with the discharge orifice and of larger capacity. Until the return flow is retarded in some way no discharge from the discharge orifice takes place, the fuel simply swirling in the swirl chamber and passing off by the return line. The swirl set up by the fuel in the swirl chamber ensures that any fuel issuing through the discharge orifice will be effectually atomised and will thus readily form a combustible mixture with the surrounding air. The swirling mass of fuel leaves centrally of the mass an air core, and should this air core extend into the spill line, the air core is liable to be broken down resulting in a pulsating spray with aeration of some of the returning fuel. This is undesirable when the burners are employed in certain operation conditions, for example, when they form part of the fuel supply apparatus of an internal combustion turbine power unit, and proposals have been made to avoid this by providing as the rear wall of the swirl chamber a baffle supported by radiating arms, or by forming the spill orifice as a circular series of circular holes arranged in the rear wall of the swirl chamber so as to leave a baffle within the series of holes. It is found that these arrangements, whilst limiting the extent of the air core, nevertheless interfere with the swirling action inside the swirl chamber, which leads to less efficient atomisation of discharge fuel and also to irregular control over the returning fuel.

The present invention seeks to provide an improved burner of the type in question whereby maximum atomisation efficiency, and smoothness of control of returning fuel may be attained, together with avoidance of aeration of returning fuel, and according to the present invention the spill orifice is formed as a continuous annulus arranged coaxially of the swirl chamber and discharge orifice, uninterrupted by any radiating arms or the like, of any sort. The inner diameter of the spill annulus is at least equal to the diameter of the discharge orifice and will usually exceed this diameter whilst the outer diameter of the spill annulus is less than the diameter of the swirl chamber. The fuel is able to pass through the annular spill orifice in a swirling condition which sets up no eddies which would interfere with the swirling action inside the chamber. The radial dimensions of the annular spill orifice may be chosen so that the spill is tapped at a convenient pressure point in the pressure gradient across the vortex in the swirl chamber, and the width or radial dimensions of the spill orifice will preferably be such as to avoid any considerable pressure drop across it.

Figures 2, 3:
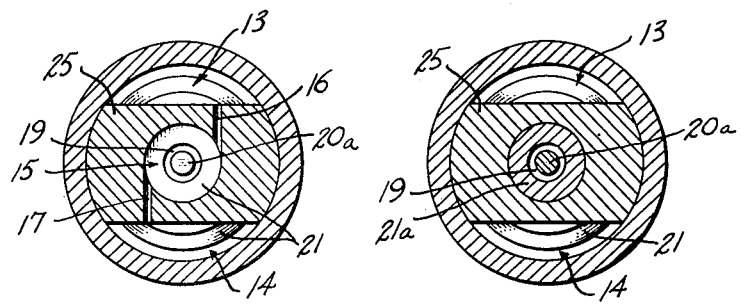

A preferred construction of spill burner in accordance with the invention will now be described with reference to the accompanying drawings of which Figure 1 is a longitudinal sectional elevation, and Figures 2 and 3 are transverse sectional elevations taken on the lines 2—2 and 3—3, respectively, in Figure 1.

As shown, an annular supply duct 11 conducts fuel through an annular filter 12 into spaces 13 and 14 from which the fuel enters a swirl chamber 15 in a first member 25 through tangential passages 16 and 17 respectively in the peripheral wall defined by a rearwardly directed skirt 25a. The swirl chamber 15 converges at its outer end to a circular discharge orifice 18, disposed at the chamber's axis, and at its other end has a substantially flat end wall in which, inwardly from the peripheral wall, is formed a spill orifice 19 comprised by the annular space between an inner third member 20 and an outer second member 21. The second member 21 has a reduced forwardly projecting cylindrical portion 21a which fits snugly within the rear end of the first member's skirt 25a; the forward terminus of the portion 21a constitutes a part of the rear wall of the swirl chamber, and preferably lies in a plane normal to the chamber's axis. Rearwardly the second member is enlarged at 21b, and the third member 20 closes this enlarged portion 21b, and is spaced rearwardly of the forward wall thereof, to define between them a diffusing chamber 22, of large diameter relative to the swirl chamber 15. The third member 20 is formed with an axially disposed stem 20a projecting forwardly through the diffusing chamber and through, but spaced inwardly within, the cylindrical portion 21a of the second member, to define in conjunction with the latter the completely annular, uninterrupted spill orifice 19 already referred to, through which fuel from the swirl chamber 15 may escape to the diffusing chamber 22, and thence by way of ports 23 to a return line 24. The forward tip of the stem 20a should be located in the vicinity of the plane of the rear wall of the swirl chamber; preferably this tip is flat and coplanar with the tip of the cylindrical portion 21a, and the two tips cooperate to define the rear wall of the swirl chamber, which is uninterrupted except for the annular spill orifice 19.

It is particularly desired to note that the stem 20a is supported from a point rearwardly of the spill orifice, so that there is no interruption of the swirling movement of the liquid fuel as it passes from the swirl chamber to the diffusing chamber; indeed, since the stem's support is actually at the rear end of the diffusing chamber, it offers no obstacle to smooth movement of the liquid about the diffusing chamber. The first obstacle transverse to the escaping liquid is encountered as it enters the ports 23, by which time its peripheral movement has been slowed down and converted in part into axial movement, and the minor eddies there generated can not reflect back to disturb the smooth flow about the swirl chamber.

Additionally it should be noted, as to the annular spill orifice, that it is of a capacity for discharge at least as great as the capacity of the discharge orifice 18, and usually of greater capacity; that the stem 20a is of a diameter greater than the diameter of the discharge orifice 18, wherefore the spill orifice 19 lies wholly outside the axial projection of the discharge orifice, and the tip of the stem constitutes a stop for the hollow core within the swirling liquid; and that the outer margin of the spill orifice 19 preferably lies somewhat inside the peripheral wall of the swirl chamber, that is to say, inwardly of the juncture between the peripheral wall and the rear wall, especially noticeable when the rear wall is flat. This leaves a definite annular margin of rear wall surrounding the annular spill orifice.

In operation, fuel entering the swirl chamber through the tangential passages, sets up a swirling motion within the chamber 15. If there is no resistance in the spill line 24, the swirling mass of fuel will leave the swirl chamber through the annular spill orifice 19 and pass off through the diffusing chamber 22 and through the holes 23 into the spill line 24. If there is some or sufficient resistance to return flow, some of the fuel in the swirl chamber will pass through the discharge orifice 18 to form a finally atomised conical spray. It will be appreciated that within the swirl chamber 15 the fuel builds up into a tube of fuel within which there is an air core. The flat tip of the stem 20a within the annular spill orifice 19 forms a baffle limiting the extent of penetration of the air core in the return direction, and the continuous nature of the spill orifice 19 is such as to set up no eddies which would interfere with the swirling action inside the chamber 15. By passing into the diffusing chamber 22, the fuel loses its swirling action, at least to some extent, before passing through the return holes 23 on its way to the spill line 24. By permitting the fuel to spill through the orifice 19 located inwardly from the peripheral wall of the swirl chamber, and especially when the portion of the chamber's rear wall outwardly of the spill orifice is flat, the integrity of the swirling tube of fuel is maintained, and spilling is permitted only from a circle adjacent the inner wall of such tube of fuel. This improves the uniformity of the spray discharge under all operating conditions.

I claim:

1. A spill burner comprising a hollow member defining a swirl chamber of round cross section having tangentially arranged inlet openings in its peripheral wall, a discharge orifice axially located at its forward end, and a rear wall opposite said discharge orifice, said rear wall being axially apertured, inwardly from the chamber's peripheral wall, to leave a surrounding annular portion as part of the rear wall, and an element supported rearwardly of said rear wall, projecting forwardly through its aperture, coaxially spaced within the margin of said aperture, and having its forward terminus disposed substantially coincident with the surface of the swirl chamber's annular rear wall portion, to define, in conjunction with the rear wall's aperture, a wholly uninterrupted annular spill orifice spaced inwardly from the swirl chamber's peripheral wall.

2. A spill burner as in claim 1, wherein the rear wall and the coincident forward terminus of the spill-orifice-defining element in combination define a plane disposed normal to the axis of the swirl chamber, uninterrupted otherwise than by the annular spill orifice the outer margin of which is located inwardly from the juncture between such rear wall and the peripheral wall of the swirl chamber.

3. A spill burner comprising a hollow member defining a swirl chamber of round cross section having tangentially arranged inlet openings in its peripheral wall, a discharge orifice axially located at its forward end, and a rear wall opposite said discharge orifice, said rear wall having a single, circular, axially located discharge aperture, said hollow member being enlarged radially, rearwardly of said discharge aperture, to define a diffusing chamber located substantially wholly radially outwardly of said discharge aperture, whereinto the swirling tube of fuel enters through the discharge aperture, enlarges, and slows down, an element ported for further discharge but otherwise closing and defining the rear end of said enlarged diffusing chamber, said element having an axially disposed forward extension projecting within the discharge aperture of the swirl chamber, spaced within the margin of such discharge aperture to define therewith an annular spill orifice which is wholly uninterrupted circumferentially, from the swirl chamber to the rear end of the diffusing chamber, and of a capacity at least as great as the sum of the capacities of the tangential inlet openings.

4. A spill burner comprising a hollow first member formed with a substantially cylindrical rearwardly directed skirt and an interiorly converging forward wall axially apertured to define a discharge orifice, a second member having a forwardly projecting cylindrical portion snugly fitting within said skirt, to define with said first member a swirl chamber, the first member having tangentially arranged inlet openings to such swirl chamber, and the forward tip of the cylindrical portion of said second member constituting part of the rear wall of the swirl chamber, said second member having an enlarged rearwardly projecting portion, a third member cooperatively engaging the enlarged rear portion of the second member, and spaced from the forward wall of said enlarged portion, to define therebetween a diffusing chamber, said diffusing chamber having ports for discharge of fuel, and a cylindrical stem projecting forwardly from said third member, coaxially of and entering but spaced within the forwardly projecting portion of the second member, to define in conjunction therewith an annular, completely uninterrupted spill orifice leading from the swirl chamber to the diffusing chamber, the forward terminus of said stem being located in the vicinity of the rear wall of the swirl chamber.

5. A spill burner comprising a hollow member having a cylindrical peripheral wall forming a swirl chamber having tangentially arranged inlet orifices, and a circular discharge orifice axially located in the forward end thereof and of a diameter small in comparison to said cylindrical wall, said swirl chamber having also a rear wall closing the opposite end of said swirl chamber but having axially located therein a circular spill opening larger in diameter than said discharge orifice but smaller than the peripheral wall, a cylindrical member projecting into said spill opening in spaced coaxial relation therewith, from a location beyond the rear wall of said swirl chamber into the vicinity of such rear wall, said cylindrical member being of a diameter, in relation to the diameters of the discharge orifice and of the spill opening, to define in conjunction with said spill opening a continuous annular spill orifice of capacity at least as great as the sum of the capacities of said inlet orifices, and located wholly outwardly of the axial projection of said discharge orifice.

6. A spill burner comprising a hollow member having a cylindrical peripheral wall forming a swirl chamber having tangentially arranged inlet orifices, and a circular discharge orifice axially located in the forward end thereof and of a diameter small in comparison to said cylindrical wall, said swirl chamber having also a flat rear wall closing the opposite end of said swirl chamber but having axially located therein a circular spill opening larger in diameter than said discharge orifice but smaller than the peripheral wall, a cylindrical member projecting into said spill opening in spaced coaxial relationship therewith, from a location beyond the rear wall of said swirl chamber and having a flat tip coplanar with said flat rear wall, said cylindrical member being of a diameter generally intermediate the diameters of said discharge orifice and said spill opening and defining in conjunction with said spill opening a continuous annular spill orifice located wholly outwardly of the axial projection of said discharge orifice.

7. The spill burner defined in claim 6 including a tubular closure means received within the rear end of the hollow member, to define the swirl chamber's rear wall, the interior of said closure means being substantially enlarged at a location rearwardly beyond the spill orifice to define a diffusing chamber which receives fuel swirling out through said spill orifice from the swirl chamber, and wherein the cylindrical member projecting into the spill opening is enlarged in diameter at a location beyond the spill orifice and fits within the enlarged part of the tubular member to define the rear end closure for the diffusing chamber therewithin, the enlarged part of said cylindrical member having a hollow interior forming a return passage and having apertures in its inner end for conducting the fuel from the diffusing chamber into such return passage.

References Cited in the file of this patent

UNITED STATES PATENTS

| Number | Name | Date |
| --- | --- | --- |
| 1,644,372 | Gray | Oct. 4, 1927 |
| 2,037,645 | Vroom | Apr. 14, 1936 |
| 2,308,909 | Blanchard | Jan. 19, 1943 |
| 2,315,172 | Voorheis | Mar. 30, 1943 |
| 2,373,707 | Peabody | Apr. 17, 1945 |
| 2,374,041 | Saha | Apr. 17, 1945 |